UNITED STATES PATENT OFFICE.

FRITZ LÜDY, OF BASLE, SWITZERLAND, ASSIGNOR TO HOFFMANN, TRAUB & CO., OF SAME PLACE.

BISMUTH OXYIODIDGALLATE AND PROCESS OF PREPARING SAME.

SPECIFICATION forming part of Letters Patent No. 544,104, dated August 6, 1895.

Application filed December 12, 1894. Serial No. 531,584. (Specimens.)

*To all whom it may concern:*

Be it known that I, FRITZ LÜDY, chemist, a citizen of the Swiss Republic, residing at Basle, Switzerland, have invented new and useful Improvements in the Manufacture of Chemical Substances Prepared for Use in Medicine and Pharmacy, of which the following is a specification.

I have discovered that among other bismuth combinations, bismuth subgallate (dermatol) on being treated with dilute halogen-hydrogen acids can take up, in addition to the remainder of the gallic acid, an additional halogen atom in the place of hydroxyl. There is thus produced a mixed bismuth salt which is only decomposed on further treatment with halogen-hydrogen acids under separation of gallic acid. By this means I am enabled to obtain a bismuth oxyiodidgallate which is of therapeutical value. It is of a greyish green color, amorphous, insoluble in water and ordinary solvents, easily soluble in potash or soda lye, not decomposable by light, but decomposes slowly under the influence of moist air.

Bismuth oxyiodidgallate can be applied with advantage to the treatment of wounds, owing to its high antiseptic and drying properties. The production of the said product can be obtained simpler and with greater certainty by introducing a gallic acid remainder into bismuth oxyiodid.

I found, for example, that freshly-precipitated bismuth oxyiodid can be perfectly converted into bismuth oxyiodidgallate by digesting it with gallic acid in a water-bath.

Example I: Bismuth oxyiodid separated in the known manner from 9.5 kilos crystallized bismuth nitrate is well washed and while moist is stirred together with water. 3.4 kilos gallic acid are added and the mixture is heated in a water bath until the red color has been completely changed to dark grayish green. The precipitate is collected, washed, and then dried at a moderate heat.

The reaction of the above example is expressed by the formula:

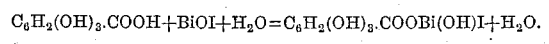

Example II: Ten kilos bismuth gallate (dermatol) are treated under heating with 3.1 kilos iodid of hydrogen until the yellow color has been entirely converted into a grayish green It is then washed and dried at a moderate heat.

The reaction of the above example is expressed by the formula:

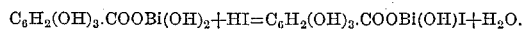

The same body is obtained from both the above examples, so that contrary to the halogen-substituted bismuth phenolates described in the specification to English Patent No. 13,291 of 1892, the halogen substitution in the present case takes place in the bismuth hydroxyl and not in the gallic-acid remainder.

What I claim as new, and desire to secure by Letters Patent, is—

1. The process of manufacture of bismuth-oxyiodidgallate by the reaction of gallic acid upon bismuthoxyiodid, substantially as described.

2. As a new article of manufacture, the herein described bismuthoxyiodid-gallate, constituting in a dry state, a grayish green, amorphous powder, which is insoluble in water and ordinary solvents, soluble in potash or soda lye, not decomposable by light but decomposes slowly under the influence of moist air.

In witness whereof I have hereunto signed my name in the presence of two subscribing witnesses.

FRITZ LÜDY.

Witnesses:
 GEORGE GIFFORD,
 AMAND RITTER.